Dec. 6, 1966 C. M. CASSELMAN ET AL 3,289,297
TOOL FOR REMOVING OLD TILE CEMENT OR MASTIC FROM WALLS AND FLOORS
Filed Feb. 12, 1965
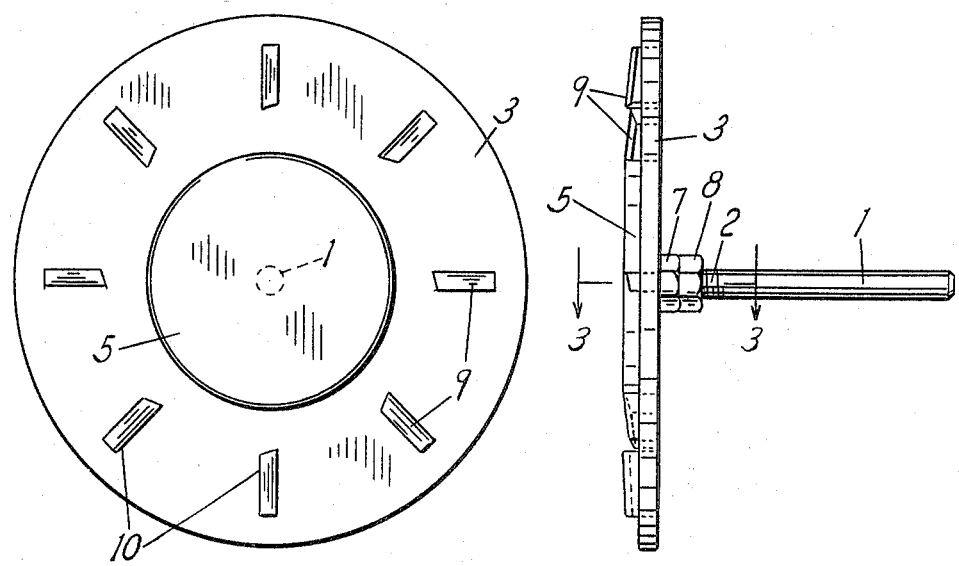
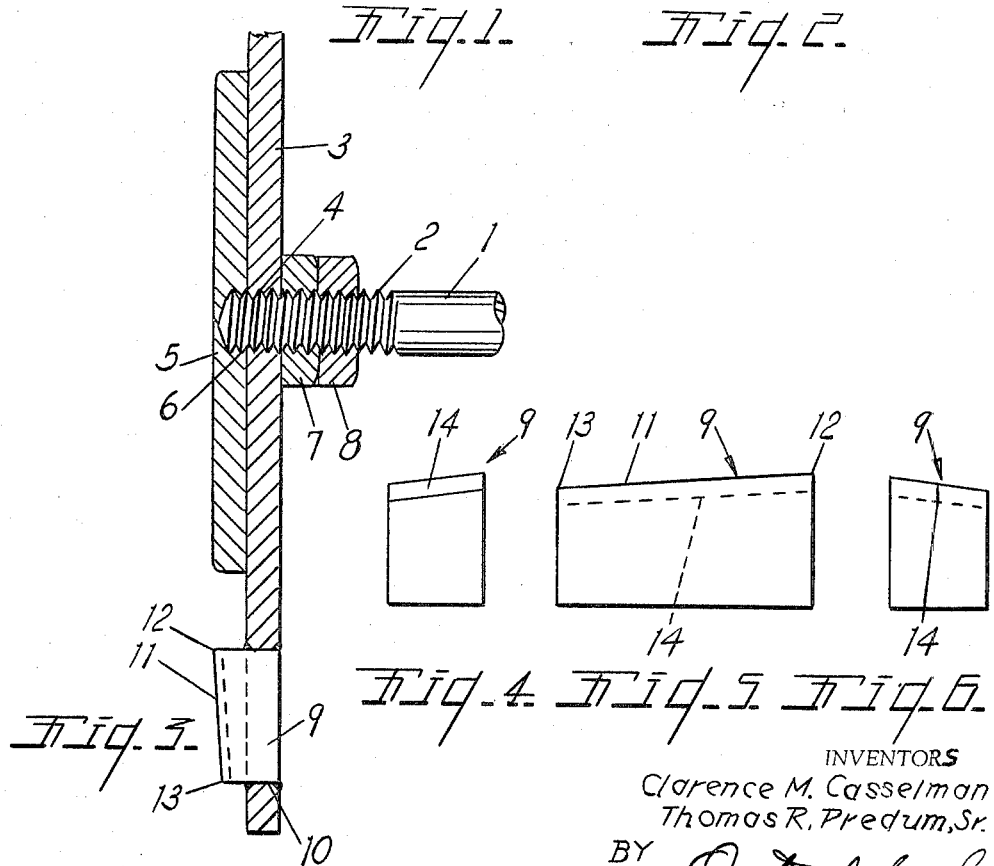
INVENTORS
Clarence M. Casselman
Thomas R. Predum, Sr.
BY
ATTORNEY.

United States Patent Office 3,289,297
Patented Dec. 6, 1966

3,289,297
TOOL FOR REMOVING OLD TILE CEMENT OR MASTIC FROM WALLS AND FLOORS
Clarence M. Casselman and Thomas R. Predum, Sr., both of 448 W. North, Kalamazoo, Mich.
Filed Feb. 12, 1965, Ser. No. 432,247
4 Claims. (Cl. 30—347)

This invention relates to a manually portable and manipulatable tool for removing hardened material from a surface such as a wall, a floor or the like. The main objects of this invention are:

First, to provide an implement which is adapted for hand manipulation of a power driven tool in removing hardened material from a surface such as a floor, wall or the like.

Second, to provide a tool for removing hardened material from a floor, wall or the like, which does not cut into the surface on which it is used, even when held against the surface after the material has been removed as desired.

Third, to provide an implement having these advantages which is highly effective and at the same time is easily manipulated.

Fourth, to provide an implement for removing projecting hardened material from a surface in which the blades first cut away the higher points of projecting material and progressively reduce the projections to the level of the surface on which the material is adhered.

Objects relating to details and economies of the invention will appear from the description to follow. The invention is defined and pointed out in the claims. A preferred embodiment of the invention is illustrated in the accompanying drawing, in which:

FIG. 1 is a front view of an implement embodying our invention.

FIG. 2 is a side elevation thereof.

FIG. 3 is an enlarged fragmentary view, partially in section, on a line corresponding to line 3—3 of FIG. 2.

FIG. 4 is an inner end view of one of the blades.

FIG. 5 is a side view thereof.

FIG. 6 is an end view of the other end of the blade.

The invention provides a tool for cutting irregularly shaped masses and accumulations of hardened mastic or adhesive materials from walls and other plane surfaces without damaging the surfaces from which the material is removed. The tool is characterized by having a generally flat rotatable head with a raised central surface engaging thrust member that guides the head in uniform spaced relation to the surface being cleaned. Cutting teeth or blades are arranged around the thrust member on the head, and have axially facing cutting edges that terminate at their radially inner ends in the plane of the work engaging end of the thrust member, and incline axially rearwardly and radially outwardly from such inner ends. Thus when the thrust member is engaged flat against a clean area of the surface to be cleaned, the tool with the head rotating may be advanced over the surface without danger of the teeth digging into the surface. Any raised mass or accumulation of material on the surface will be engaged first by the axially retracted outer ends of the blades. Movement of the head over the surface will cause the inclined edges of the blades to progressively cut away the accumulation until the radially inner tips of the blades remove the final thickness of the accumulation at the surface of the wall being cleaned.

The embodiment of our invention illustrated is adapted to be used on hand manipulatable electrically powered motors. We have not illustrated a motor, as motors may be greatly varied and there are various types on the market with which our implement may be used.

The embodiment of our invention illustrated comprises a rod-like spindle 1 having a threaded inner end 2. The cylindrical disk-like head member 3 is formed of plate metal stock, that is, it is desirably of uniform thickness as is illustrated, and it has a central internally threaded bore 4 into which the spindle is threaded with the spindle projecting from the outer side of the head member. The cylindrical disk-like work engaging member 5 is internally threaded at 6 and has threaded engagement with the portion of the spindle projecting from the head member.

The nut 7 is threaded upon the spindle and serves to clamp the thrust member 5 against the face of the head member. A lock nut 8 is desirably provided. With the parts thus arranged, the head member and the thrust member are clampingly secured to the spindle. However, the head member and the thrust member can be removed from the stem in the event it is desirable to replace them, or in the event it is desirable to remove the head member to facilitate placing of blades designated generally by the numeral 9. The head member is provided with radial slots 10 into which these blades are in close fit. They are fixedly secured by welds or other means not illustrated. There are eight blades in the embodiment of our invention illustrated, but it will be understood that the number may be varied. However, it is desirable that the blades be uniformly spaced and sufficient in number to minimize tilting of the implement on the surface such as a floor, wall or the like. The means for securing the blades is not illustrated for the reason that it may be varied, but it should be understood that the blades are fixedly secured to the head member and have hardened outer portions so that they are capable of removing from a surface such materials as a ceramic cement, plastic wall tile cement, aluminum tile adhesive, and other adhesives such for example as used in securing tiles to a wall or floor. When it is desired to remove the tile or the like from a wall or floor, as for replacement of the material, the thrust member permits the device being laterally moved on the surface and prevents digging or cutting into the surface in the event that the device is held against the surface longer than is necessary to remove the material.

The tool may be held with the axis of shaft 1 at an angle other than 90°, i.e. tilted, relative to the wall from which material is being removed to clear a flat starting area. The radial angle along the edges 11 of the blades 9 locates the inner corners 12 at the level of the peripheral edge of the thrust member 5 so that even if the tool is tilted, the edges of the cutters will not cut into the wall because the thrust member will contact the wall and limit inward cutting of the blades before the edges cut beyond the plane of the wall. For fast cutting on relatively soft material, or to start a cutting operation, the tool may purposely be tilted to the angle of the edges 11 to cut with the entire edge along one side of the disc.

When the tool is held with the thrust member 5 flat against the wall, the lower outer corners 13 of the edges 11 first contact a projecting mass to start the cut and the increasing height of the edge progressively cuts away the remainder of the mass as the tool is moved over the surface. Desirably the blades are raked rearwardly on their trailing surfaces at 14.

What is claimed as new is:

1. A manually manipulatable implement comprising a thrust sustaining and rotary driving spindle, a circular head member mounted in driven engagement on the end of said spindle and having an outer face extending radially from the spindle, a work engaging thrust member positioned in the center of said outer face and having a planar outer end normal to the axis of said spindle, and a plurality of blades mounted on said outer face of said head member in angularly spaced relation around said thrust member and projecting to radially outwardly spaced positions from said thrust member, said blades having axially facing cutting edges that terminate at their radially inner ends in the plane of the planar outer end of said thrust member and incline axially rearwardly and radially outwardly from said inner ends.

2. An implement as defined in claim 1 in which said blades are disposed on said head member in radially outwardly spaced relation to the edge of said thrust member, and in which said cutting edges of said blades are disposed in planes radial to said spindle.

3. An implement as defined in claim 1 in which said head member is removably secured against an abutment on said spindle, and in which said work engaging thrust member is removably and threadedly engaged with the end of said spindle with its axially inner side in clamping engagement with said head member.

4. An implement as defined in claim 3 in which said work engaging thrust member has an imperforate outer end with said spindle being threadedly engaged only part way through the thrust member from the inner side thereof, and in which said abutment on said spindle is formed by a nut adjustably threaded on said spindle on the axially inner side of said head member.

References Cited by the Examiner
UNITED STATES PATENTS

| | | | |
|---|---|---|---|
| 779,224 | 1/1905 | Leeder | 125—26 |
| 782,324 | 2/1905 | Christopher | 125—26 |
| 1,684,096 | 9/1928 | Hughes | 85—35 |
| 2,827,973 | 3/1958 | Coleman | 85—35 X |
| 2,831,451 | 4/1958 | May | 30—172 X |
| 3,049,739 | 8/1962 | Lantto. | |

WILLIAM FELDMAN, *Primary Examiner.*

JAMES L. JONES, JR., *Examiner.*